March 14, 1961 H. J. KEEN ET AL 2,975,261
TEMPERATURE CONTROL SYSTEM
Filed Sept. 11, 1958 2 Sheets-Sheet 1

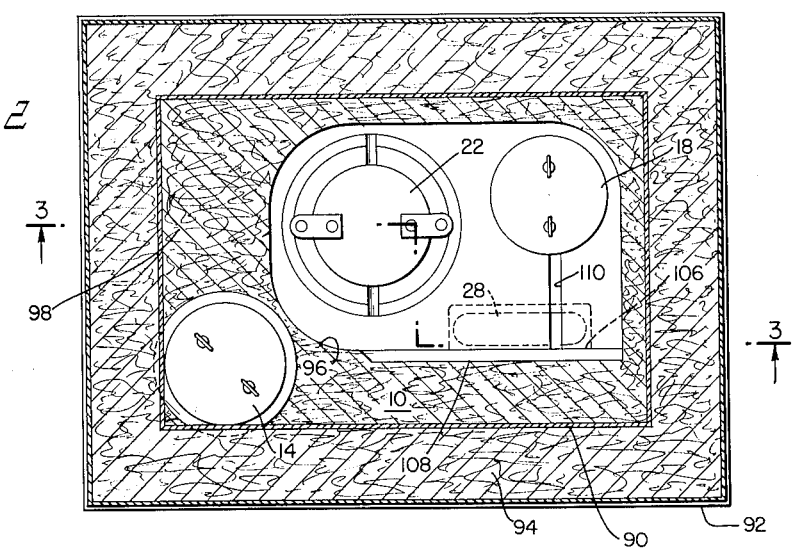
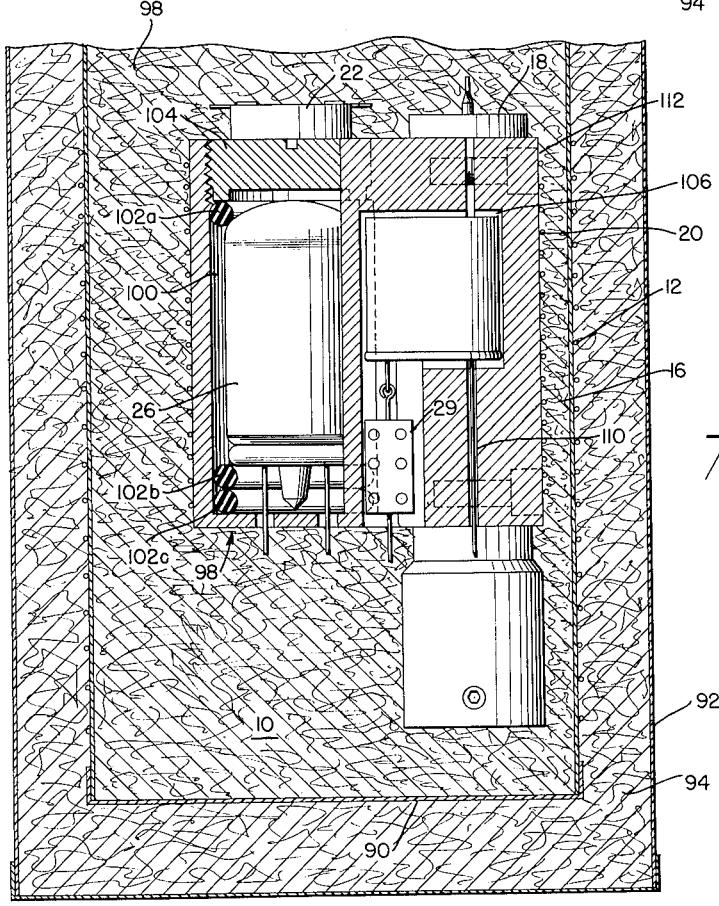

United States Patent Office 2,975,261
Patented Mar. 14, 1961

2,975,261

TEMPERATURE CONTROL SYSTEM

Harry J. Keen, Middletown, and Kay G. Sears, Keyport, N.J., assignors to Lavoie Laboratories, Inc., Morganville, N.J., a corporation of New Jersey Filed Sept. 11, 1958, Ser. No. 760,382

4 Claims. (Cl. 219—20)

This invention relates to temperature control and more particularly to constant temperature ovens. The term "oven" being used to include any enclosure provided with heating means.

Of the many temperature control systems that are used, one that requires very rigid maintenance of a constant temperature is concerned with the generation of periodically varying electrical signals by means of piezoelectric crystals. As the crystal vibrates, an electrical signal is generated which oscillates at the vibratory frequency of the crystal. Piezoelectric crystals while having very sharp resonant peaks are, however, temperature sensitive. A change in the temperature results in a change of the mechanical resonant frequency of the crystal. Piezoelectric crystals have different temperature coefficients (measures of the change of resonant frequency with temperature) which depend on the material employed and the geometry of the crystals.

Although crystal controlled oscillators operate satisfactorily in many applications, the variation of their resonant frequency with temperature cannot be tolerated in precision systems. Many attempts have been made to temperature stabilize the crystals. In general, the temperature stabilization involves enclosing the crystal in a heated chamber or oven and attempting to maintain the temperature of the oven constant. Heretofore, it has been customary to maintain the temperature of the oven constant by using thermostats which switch the flow of current to a heating element. When the temperature of the oven drops below a given temperature the thermostat operates to switch current to the heating element and when the temperature of the oven exceeds a given value the current switched off. In other words, the control operates over a given range and is digital; the control of current flow is on or off.

Although there have been attempts to provide continuous control of the rate of heat generation, these have involved complicated electromechanical devices which because of their inherent mechanical inertia have slow response times. This slowness of response time can under certain conditions be as ineffective as a digital control operation.

It is accordingly an object of the invention to provide an improved constant temperature oven.

It is another object of the invention to provide an improved constant temperature oven which employs a continuous control of the rate of generation of heat.

It is a further object of the invention to provide an improved constant temperature oven employing substantially immediately responsive continuous control of the rate of generation of heat in the oven chamber.

As applied to crystal ovens, the invention contemplates a constant temperature system which includes a chamber for containing a piezoelectric crystal or other temperature sensitive element which must be maintained at as constant a temperature as possible. Associated with the constant temperature system is a temperature sensitive control element for generating a signal having characteristics such as frequency or amplitude related to the temperature of the chamber. Signal comparison means which is responsive to the temperature sensitive control element and to a second signal from a constant source generates a third signal having a characteristic such as amplitude which is proportional to the difference of the characteristics of the first and second signals. A heat source associated with the chamber is responsive to the signal comparison means to generate heat at a rate proportional to the characteristics of the third signal.

In one aspect of the invention, means is included to insure that the temperature of the chamber never exceeds a predetermined temperature because of transient conditions or a temporary malfunctioning of the controls associated with the heat source.

In another aspect of the invention, means are included for deactivating the heat source if the temperature overshoots during the initial warm-up period.

In a further aspect of the invention auxiliary heat sources with associated control elements may be included in the constant temperature system to insure a fast arrival of the temperature of the chamber to its normal operating range.

Other objects, features and advantages of the invention will be evident from the following detailed description when read in connection with the accompanying drawings wherein:

Fig. 2 is a top view, with the top removed, of the constant temperature oven of Fig. 1.

Fig. 3 is a sectional view taken along the line 3—3 of Fig. 2.

Figure 1:
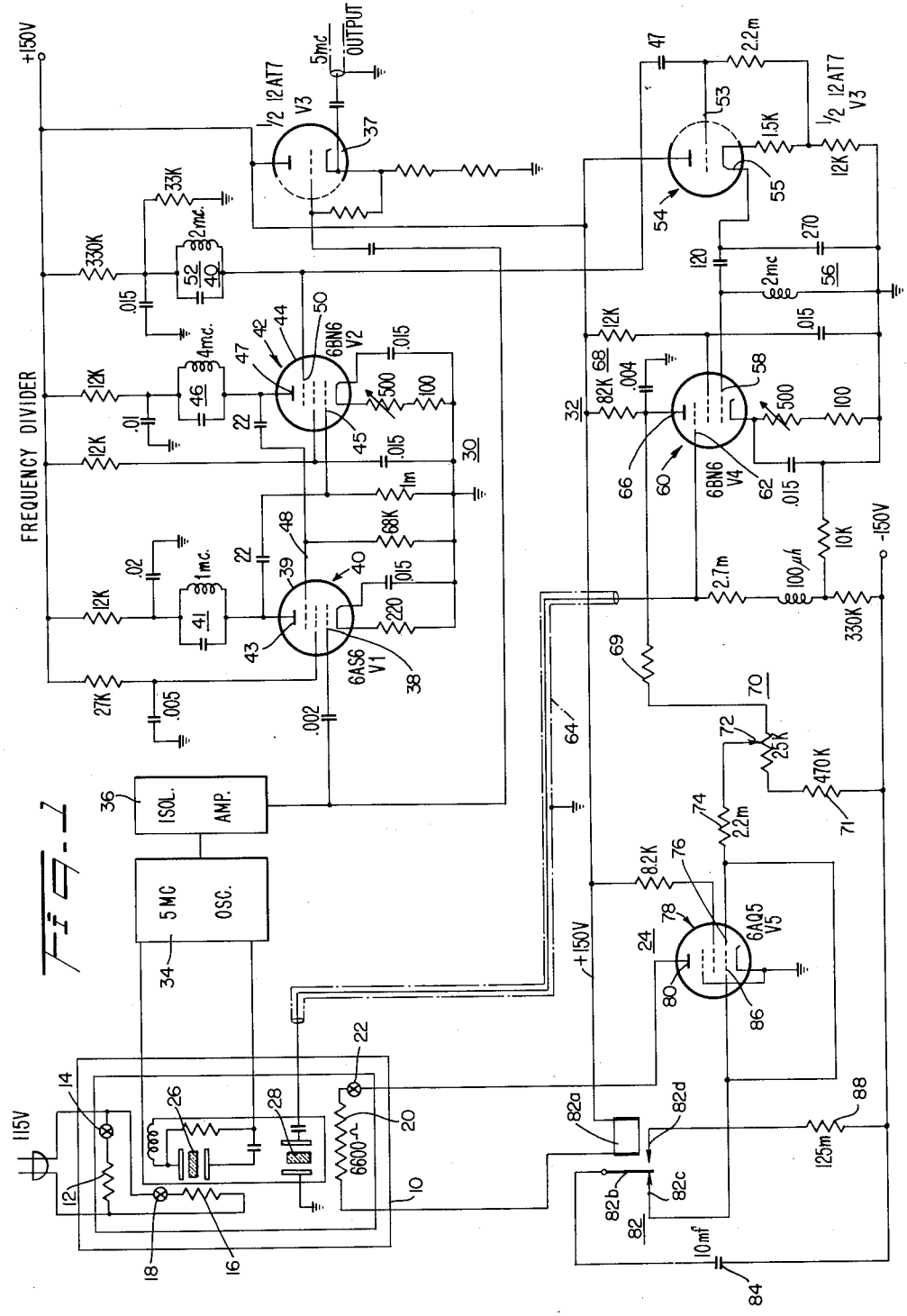
Fig. 1 is a schematic diagram of a constant temperature oven with control circuitry in accordance with the invention.

In Fig. 1 there is shown by way of example a constant temperature oven system for controlling the temperature of a crystal, which includes a chamber 10 heated by a first stage heater 12 connected to a source of alternating current 115 and controlled by a serially connected first stage thermostat 14. A fast warm-up heater 16 also connected to the alternating current source 115 and controlled by a serially connected fast warm-up thermostat 18 and a proportional heater 20 having an overheat cutout 22 and connected to the proportional current source 24.

A controlled crystal 26 and a controlling crystal 28 are disposed in chamber 10. The controlled crystal 26 is a precision piezoelectric crystal which has a reference resonant frequency of selected value, for example five megacycles. By reference resonant frequency is meant the frequency when the desired operating temperature of for example 75 degrees centigrade is reached. The temperature coefficient of controlled crystal 26 is made as small as practicable. On the other hand, the controlling crystal 28 has a high temperature coefficient, i.e., plus 50 cycles per degree centigrade and may have a different reference resonant frequency, for example two megacycles. Controlled crystal 26 is coupled to an oscillator circuit 30, and controlling crystal 28 is coupled to a frequency comparison circuit 32.

Generally, in operation, the three heaters 12, 16, and 20 are initially energized. The first stage thermostat 14 controlling the current to the first stage heater 12 which determines the ambient temperature of the chamber 10 is set for a selected temperature below the desired temperature of the controlled crystal, for example sixty-eight degrees centigrade. When the ambient temperature exceeds this value, the first stage heater 12 is disconnected by its thermostat 14 from the alternating current source 115. The fast warm-up thermostat 18 which is sensitive to the temperature of a heat storage block, hereinafter more fully described, which envelops the crystals 26 and 28, is set to disconnect the fast warm-up heater 16 from the alternating current source 115 when the temperature of the block exceeds a slightly higher value, for example seventy degrees centigrade. The remainder of initial warm-up period and the maintenance of the operating temperature is accomplished by the proportional heater 20.

The control of the proportional heater 20 is dependent on the difference between the desired operating temperature and the actual temperature of the crystals 26 and 28. Specifically, the magnitude of the difference between these two temperatures determines the quantity of current fed to the proportional heater 20 by the proportional current source 24. In the example illustrated in the drawings, the five megacycle signal generated by the controlled crystal 26 is frequently divided to a two megacycle frequency signal by the oscillator circuit 30. This two megacycle signal is fed to an input terminal of the frequency comparison circuit 32. At the same time, a signal having a frequency displaced from two megacycles by a quantity related to the difference between the actual temperature and the desired operating temperature is received from the controlling crystal 28 by another input terminal of the comparison circuit 32. Comparison circuit 32 generates a direct current signal whose amplitude is directly proportional to the difference in the frequencies of the received signals.

The direct current signal is fed to proportional current source 24. The proportional current source 24, which is basically a current amplifier, feeds current to the proportional winding 20 (basically a resistance). Thus, as the temperature difference decreases, the rate of generation of heat decreases, whereas when the temperature difference increases the rate of generation of heat increases and a proportional control of the rate of heat generation is obtained.

In greater detail, the controlled crystal 26 drives a five megacycle oscillator 34, which feeds an isolation amplifier 36. Isolation amplifier 36 feeds a cathode follower amplifier 37, acting as a source of a precisely controlled five megacycle signal. In addition, isolation amplifier 36 is coupled to the control grid 38 of a pentode vacuum tube 39 of a first stage amplifier 40 in the oscillator circuit 30 acting as frequency divider. The five megacycle signal received on the first control grid 38 is non-linearly amplified by the tube 39 to a signal rich in harmonics. A tank circuit 41 tuned to one megacycle, connected to the anode 43 of the pentode vacuum tube 39 selects a one megacycle signal for transmission to a second stage amplifier 42 of the oscillator circuit 30. The one megacycle signal is received by the control grid 45 of a gated beam detector 44 which generates a signal rich in harmonics. A four megacycle tank circuit 46, connected to the anode 47 of gated beam detector 44, selects a four megacycle signal which is fed back to the suppressor grid 48 of the pentode vacuum tube 39. A heterodyning action takes place between the five megacycle signal received on the control grid 38 and the four megacycle signal received on the suppressor grid 48, which generates a beat frequency of one megacycle. The one megacycle signal is amplified and selected by the tank circuit 41 for transmission to the control grid 45 of the gated beam detector 44. This tube, in addition to generating a four megacycle harmonic, also generates a two megacycle harmonic. The two megacycle signal, selected and amplified by a two megacycle tank circuit 52 connected to the quadrature grid 50 of the gated beam detector 44, is fed to the control grid 53 of a cathode follower amplifier 54.

The two megacycle signal is fed from cathode 55 via a two megacycle filter 56 to the control grid 58 of a gated beam detector 60 in the frequency comparison circuit 32. Sharp current pulses are fed from the quadrature grid 62 of tube 60 by a shielded conductor 64 to shock excite the controlling crystal 28, which thereupon starts resonating at its natural frequency for the actual temperature. Because of loose coupling, this oscillation is not forced, and, therefore, the frequency of the signal generated by the controlling crystal 28 is at its own natural resonant frequency. This signal is fed back to the grid 62 of tube 60 and will be in phase with the initiating pulses if the natural frequency of the controlling crystal 28 at the existing temperature equals the standard frequency from the cathode follower amplifier 54. The gated beam detector 60 has the property of passing unidirectional pulses of negative porality from its anode 66 when periodically varying signals are present on both its control grid 58 and its quadrature grid 62. Maximum amplitude pulses are transmitted from its anode when signals of the same frequency and in phase are present on both grids and the amplitude of the current pulses decreases as the frequency difference with consequent phase difference increases.

The anode 66, in addition to being coupled to a filtering network 68, is connected to a negative potential of 150 a resistor network comprising a resistance 69, voltage divider 70 and resistance 71. A variable tap 72 of the voltage divider is connected through a resistor 74 to the control grid 76 of a vacuum tube amplifier 78 in proportional current source 24. The position of variable tap 72 is chosen so that vacuum tube amplifier 78 is substantially cut off when the maximum amplitude pulses are transmitted from anode 66 of tube 60. As these pulses decrease in amplitude, the potential on control grid 76 rises. A rise in the potential of control grid 76 is accompanied with an increase in current flow through vacuum tube amplifier 78 and hence through the proportional heater 20 which is coupled to the anode 80 of tube 78. Thus, the smaller the amplitude of the pulses on the anode 66, because of the greater the difference in frequencies of the signals received by the grids 58 and 62 of the gated beam detector 60, the greater is the current flowing through the proportional heater 20 and the greater the rate of generation of heat.

Two problems can arise in the operation of the system. One is the possibility of temperature overshoot during the initial warm-up period. It is therefore necessary to slow up the rate of change of temperature as the actual temperature approaches the desired operating temperature so that thermal inertia does not carry the actual temperature beyond the range of temperatures over which the controlling crystal 28 can exercise control. Therefore, means are provided to temporarily disable the proportional current source 24 when an impending overshoot is sensed during the initial warm-up period. The means includes a relay 82 having its coil 82a disposed in the anode circuit of vacuum tube amplifier 78, a moving contact 82b coupled to a capacitor 84, a normally closed contact 82c connected to the control grid 86 of vacuum tube amplifier 78, and a normally open contact 82d connected via a resistor 88 to the source negative potential −150.

Initially, the quantity of current through the anode circuit of vacuum tube amplifier 78 is sufficiently large to energize relay 82 causing the moving contact 82b to contact the normally open contact 82d, and a negative charge is thereby accumulated on capacitor 84. The initial warm-up period is sufficiently long to permit the capacitor 84 to charge substantially to full ngeative potential. If the current is the anode circuit then decreases below a predetermined minimum indicating an impending temperature overshoot, relay 82 deenergizes and moving contact 82b transfers to normally closed contact 82c. A negative potential is thereby applied to the control grid 76 cutting off the vacuum tube amplifier 78, which remains in a non-conductive state until the capacitor 84 discharges. The discharge path includes the resistor 74 and the voltage divider 70. The amount of resistance in the discharge path is chosen to provide a sufficiently long time constant to insure that the discharge is completed only after the actual temperature falls to a predetermined value. Upon substantially complete discharge of the capacitor 84, current again flows in the anode circuit and the actual temperature slowly rises to the desired operating temperature. Since the actual temperature is now within the control range, proportional control takes over and the relay 82 remains energized. In other words, the system in a sense does not now have a chance to build up thermal momentum.

Once the operating period is attained, a second problem may arise since the system is in effect a one sided servo system. As the actual temperature approaches the operating temperature, the difference in frequencies decreases, causing the rate of heat generation to decrease. If the actual temperature backs off from the operating temperature, the difference in frequencies increases causing an increase in the rate of heat generation. If for some reason the frequency difference passes through zero, an increase in temperature is accompanied by an increase in frequency difference which increases the rate of generation of heat and the system can run away. Electrical transients in the system may initiate such a runaway. Accordingly, means are provided to prevent an uncontrolled runaway by forcing the actual temperature to return to a value below the operating temperature. This means is primarily the overheat cutout 22 connected in series with the proportional heater 20. The overheat cutout 22 is essentially a thermostat which is activated to break the circuit when the actual temperature reaches eighty degrees centigrade for example and is deactivated to close the circuit when the actual temperature returns to seventy degrees centigrade. Thus, if the system starts to run away, the proportional heater 20 is disabled until there is a cooling off which permits the controlling crystal 28 to regain control.

In order to achieve maximum sensitivity and minimum thermal lag in response, the relative positions of the several heaters, thermostats and crystals are important. Figs. 2 and 3 show by way of example the orientation of these elements in the chamber 10. In particular, the chamber 10 is defined by an inner container 90 surrounded by an outer container 92. Insulating material 94 is interposed between the inner container 90 and the outer container 92 minimize heat conduction from the chamber 10. To establish a substantially constant ambient temperature, the first stage heater 12 is disposed around the inner container 90.

Within the inner container 90, the first stage thermostat 14 and a block 96 are positioned amid insulating material 98. The thermostat 14 is disposed so as to sense the temperature in the inner container 90 and hence the temperature around the block. The block 96 is formed of heat conducting material such as aluminum or brass and contains or supports the first warm-up thermostat 18, the overheat cutout 22, the controlled crystal 26 and the controlling crystal 28. Developed about the block 96 are the fast warm-up heater 16 and the proportional heater 20. Since the block 96 is thermally conductive it smooths out temperature gradients between the several elements.

Controlled crystal 26 is positioned in a cavity 100. Shock mounts 102 minimize mechanical influences on the controlled crystal 26. Access to the cavity 100 is afforded by a port which is sealed off by threaded plug 104, upon which is fixed the overheat cutout 22. Controlling crystal 28 is similarly positioned in a cavity 106. After controlling crystal 28 is in place, the cavity 106 is sealed off by a plate 108.

A cylindrical bore in the block 96 accommodates the fast warm-up thermostat 18. To insure good thermal contact between the block 96 and the fast warm-up thermostat 18, a split 110 is made in the block 96. The inner diameter of the bore is slightly less than the outer diameter of the fast warm-up thermostat 18. Screws 112 and 114 are provided to permit the tightening of the block 96 about the fast warm-up thermostat 18. The fast warm-up thermostat 18 and the controlling crystal 28 thus sense the temperature of the block 90.

There has thus been shown a constant temperature oven system which can maintain temperatures to within a thousandth of a degree. The constant temperature oven system employs continuous controls which are substantially immediately responsive to changes in temperature so that heat may be generated in proportion to the difference between the actual temperature of a chamber and the desired operating temperature.

There has further been shown features which prevent the running away of the system, both during initial warm-up period and during the operating period because of transient effects.

While only one embodiment of the invention has been shown and described in detail, there will be obvious to those skilled in the art, many modifications and variations accomplishing the foregoing objects and realizing many or all of the advantages, but do not depart essentially from the spirit of the invention.

What we claim and desire to secure by Letters Patent is:

1. A constant temperature oven system comprising an oven, a coarse heating means associated with said oven, said coarse heating means including first and second coarse heating elements, a coarse-temperature-sensitive control means disposed in said chamber for controlling said coarse heating means, said coarse-temperature-sensitive control means including first and second coarse-temperature-sensitive control elements, said first coarse-temperature-sensitive control element deactivating said first coarse heating element at a first temperature, said second coarse-temperature-sensitive control element deactivating said second coarse heating element at a second and higher temperature, a first fine-temperature-sensitive control element operatively disposed with respect to said oven for generating a first signal having a first frequency related to the temperature of said oven, a second fine temperature sensitive control element operatively disposed with respect to said oven for generating a second signal having a second frequency related to the temperature of said oven, signal frequency comparison means responsive to said first and second fine temperature sensitive control elements for generating a third signal having an amplitude proportional to the difference in frequencies of said first and second signals, and a fine temperature heating means responsive to said signal frequency comparison means for generating heat at a rate proportional to the amplitude of said third signal, and means for deactivating said fine temperature heating means at a third higher temperature.

2. A constant temperature oven system for piezoelectric crystals comprising an outer jacket, an inner jacket, insulating means disposed between said inner and outer jackets, a source of electrical energy, a first resistance winding disposed about said inner jacket, a first thermostat operatively interposed between said first resistance winding and said source of electrical energy, said first thermostat being set to operate at a first temperature, a metal block disposed within said inner jacket, insulating means disposed between said inner jacket and said metal block, a second thermostat disposed in said block, a second resistance winding disposed about said block, said second resistance winding being coupled to said source of electrical energy via said second thermostat, said second thermostat being set to operate at a second and higher temperature, first and second piezoelectric crystals disposed in said metal block, an oscillator circuit means responsive to said first piezoelectric crystal to generate a first signal having a first frequency, means for exciting said second piezoelectric crystal to generate a second signal having a second frequency, signal frequency comparison means for generating a signal having an amplitude proportional to the difference in frequencies of said first and second signals, a current amplifying means responsive to said signal frequency amplifying means, and a third resistance winding operatively coupled to said current amplifying means, said third resistance winding being developed about said metal block, said current amplifying means feeding current to said third resistance winding as long as the temperature of said block is below a third and yet higher temperature.

3. A constant temperature oven system comprising an oven, first and second piezoelectric elements disposed in said oven, an oscillator circuit responsive to said first piezoelectric element for generating a first signal having a first frequency, signal means associated with said second piezoelectric element for generating a second signal having a second frequency, signal frequency comparison means responsive to said oscillator means and said signal means for generating a third signal having an amplitude proportional to the difference in frequencies of said first and second signals, a controlled current heating means responsive to said signal frequency comparison means, said controlled current heating means including a vacuum tube amplifier having an anode, a cathode and a control grid; a source of electrical energy; a resistance winding coupling said anode to said source of electrical energy; said control grid being coupled to said signal frequency comparison means; and means for deactivating said control current heating means for a predetermined time when the current decreases below a given value, said deactivating means comprising: a relay having a coil disposed in the anode circuit of said vacuum tube amplifier, a moving contact, and first and second fixed contacts; a source of negative potential coupled to said first fixed contact; a capacitor coupled to said moving contact; and said control grid being coupled to said second fixed contact; said second fixed contact being connected to said moving contact when the current in said coil is below a predetermined value.

4. A constant temperature oven system comprising: an oven; a heating element associated with said oven and connected to a power source for heating said oven to a constant temperature; a piezoelectric crystal disposed in said oven and having the characteristic when excited of resonating at frequencies proportional to the temperatures in said chamber; means for providing a standard frequency signal having the same frequency as said piezoelectric crystal at the constant temperature of said oven; frequency comparison means connected to receive said standard frequency signal, and loosely coupled to said piezoelectric crystal to excite said crystal to resonate at its natural frequencies for the temperatures in said oven, and to receive said natural frequencies, said frequency comparison means generating an output signal proportional to the phase differences between said standard and natural frequencies; electric current control means operatively connected to said frequency comparison means and between said heating element and said power source and to receive said output signal and responsive thereto to control the flow of current to said heating element in accordance with said signal, whereby said heating element is activated to heat said oven at a continuous rate proportional to the difference between the constant temperature and the temperature at which the oven happens to be.

References Cited in the file of this patent

UNITED STATES PATENTS

| | | |
|---|---|---|
| 1,894,687 | Hyland | Jan. 17, 1933 |
| 2,017,859 | Halstead | Oct. 22, 1935 |
| 2,505,565 | Michel et al. | Apr. 25, 1950 |
| 2,731,564 | Edlstein | Jan. 17, 1956 |
| 2,747,069 | Miller | May 22, 1956 |